United States Patent
Kim et al.

(10) Patent No.: US 8,831,045 B2
(45) Date of Patent: *Sep. 9, 2014

(54) METHOD AND APPARATUS FOR PERFORMING DISCONTINUOUS RECEPTION OPERATION BY CONNECTED MODE USER EQUIPMENT IN A MOBILE COMMUNICATION SYSTEM

(71) Applicant: Samsung Electronics Co., Ltd., Gyeonggi-do (KR)

(72) Inventors: Soeng-Hun Kim, Gyeonggi-do (KR); Gert Jan Van Lieshout, Middlesex (GB); Ju-Ho Lee, Gyeonggi-do (KR); Kyeong-In Jeong, Gyeonggi-do (KR); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 69 days.

This patent is subject to a terminal disclaimer.

(21) Appl. No.: 13/739,762

(22) Filed: Jan. 11, 2013

(65) Prior Publication Data
US 2013/0142178 A1    Jun. 6, 2013

Related U.S. Application Data

(63) Continuation of application No. 11/857,976, filed on Sep. 19, 2007, now Pat. No. 8,379,570.

(30) Foreign Application Priority Data

Sep. 19, 2006 (KR) .......... 10-2006-0090668
Feb. 16, 2007 (KR) .......... 10-2007-0016815

(51) Int. Cl.
*H04J 3/07* (2006.01)
*H04W 76/04* (2009.01)
*H04W 72/04* (2009.01)
*H04W 52/02* (2009.01)

(52) U.S. Cl.
CPC ........ *H04W 76/048* (2013.01); *H04W 52/0216* (2013.01); *H04W 72/042* (2013.01)
USPC ........................................ 370/506

(58) Field of Classification Search
CPC ............ H04W 56/01; H04W 56/0015; H04W 56/002; H04W 56/004; H04W 56/0045; H04W 56/005
USPC .................. 370/328; 455/69, 435.1
See application file for complete search history.

(56) References Cited

U.S. PATENT DOCUMENTS 8,379,570 B2 * 2/2013 Kim et al. ............. 370/328
2002/0064140 A1  5/2002 Numminen
(Continued)

FOREIGN PATENT DOCUMENTS

WO     WO0227958     4/2002

OTHER PUBLICATIONS

LG Electronics Inc., "UE State Transition in LTE_Active", R2-061002, 3GPP TSG-RAN WG2 #52, Mar. 23, 2006.
(Continued)

Primary Examiner — Albert T Chou
(74) Attorney, Agent, or Firm — The Farrell Law Firm, P.C.

(57) ABSTRACT

A method for performing a Discontinuous Reception (DRX) operation by a connected mode User Equipment (UE) in a mobile communication system. The method includes waking up at a wake-up timing, and determining whether an incoming data indication is received from a Node B; reestablishing uplink synchronization upon receipt of the incoming data indication; and waking up after sleeping for a time from the incoming data indication reception timing, receiving a transmission resource allocation message from the Node B, and receiving downlink data over allocated transmission resources.

16 Claims, 10 Drawing Sheets

(56) References Cited

U.S. PATENT DOCUMENTS

| | | |
|---|---|---|
| 2003/0117996 A1 | 6/2003 | Lim et al. |
| 2005/0153751 A1 | 7/2005 | Bultan et al. |
| 2007/0183355 A1 | 8/2007 | Kuchibhotla et al. |
| 2007/0230394 A1 | 10/2007 | Wang et al. |
| 2007/0254656 A1 | 11/2007 | Dalsgaard |

OTHER PUBLICATIONS

Ericsson, "DRX and DTX in LTE_Active", Tdoc R2-060967, TSG-RAN WG2 Meeting #52, XP-002463498, Mar. 27, 2006.

* cited by examiner

METHOD AND APPARATUS FOR PERFORMING DISCONTINUOUS RECEPTION OPERATION BY CONNECTED MODE USER EQUIPMENT IN A MOBILE COMMUNICATION SYSTEM

PRIORITY

This application is a Continuation Application of U.S. application Ser. No. 11/857,976 filed in the U.S. Patent and Trademark Office on Sep. 19, 2007, and claims priority under 35 U.S.C. §119(a) to Korean Patent Application Nos. 10-2006-0090668 and 10-2007-0016815, filed in the Korean Intellectual Property Office on Sep. 19, 2006 and Feb. 16, 2007, respectively, the disclosures of each of which are incorporated herein by reference.

BACKGROUND OF THE INVENTION

1. Field of the Invention

The present invention generally relates to a mobile communication system, and in particular, to a Discontinuous Reception (DRX) method and apparatus for minimizing power consumption by a User Equipment (UE) in a connected mode or connected state, referred to herein as a connected mode UE.

2. Description of the Related Art

A Universal Mobile Telecommunication Service (UMTS) system is a $3^{rd}$ generation asynchronous mobile communication system that uses Wideband Code Division Multiple Access (CDMA) based on Global System for Mobile Communications (GSM) and General Packet Radio Services (GPRS), both of which are European mobile communication systems.

The $3^{rd}$ Generation Partnership Project (3 GPP) is in charge of UMTS standardization, and Long Term Evolution (LTE) is now under discussion as a next generation mobile communication system of the UMTS system.

LTE is a technology for realizing high-speed packet-based communication having a data rate of a maximum of about 100 Megabits per second (Mbps). To this end, several schemes are under discussion including, for example, a scheme for reducing the number of nodes located in the communication path by simplifying a configuration of the network, and a scheme for maximally approximating wireless protocols to wireless channels.

FIG. 1 shows a DRX operation of a connected mode UE according to the prior art.

Shown in FIG. 1 is an example of a communication system to which Node B scheduling is applied. Therefore, the UE supports uplink packet services over transmission resources allocated depending on the scheduling information from the Node B. Further, the Node B determines a Modulation and Coding Scheme (MCS) according to the quality of the allocated channel, and supports reception gain of the UE by applying Hybrid Automatic Repeat reQuest (HARQ).

Referring to FIG. 1, the UE is a UE in the mode (or state) where the UE is Radio Resource Control (RRC)-connected to an upper layer. To save power, the connected mode UE, while keeping a sleep mode for a cycle having a particular length determined in an upper layer, wakes up at timings 105, 115, 120 and 125, and checks a downlink control channel allocated from the Node B to determine whether there is any data to receive. At timings 105, 120 and 125, there is no data to receive. At timing 115, there is data to receive. When there is no data to receive, e.g. at timings 105, 120 and 125, the UE switches (transitions) to the sleep mode and keeps the sleep mode until the next wake-up timing.

However, when there is any data to receive, as at timing 115, the UE receives the data from the Node B in step 140, and performs a process in step 145 of sending a response signal (ACK/NACK) indicating reception success/failure of the data transmitted based on HARQ. Thereafter, when the Node B sends a signal indicating that there is no more data to transmit, the UE stops the data reception and switches back to the sleep mode.

For convenience, the timing at which the UE wakes up is referred to herein as wake-up timing, and the time interval between the wake-up timings is referred to herein as DRX cycle length 110. The connected mode UE reduces power consumption through the DRX operation.

The UE receives signaling information, based on which the UE can calculate the wake-up timing, from the Node B in the call setup process. The wake-up timing is generally calculated as shown in Equation (1).

$$\text{Wake-Up Timing} = \text{First Wake-Up Timing} + n \times \text{DRX Cycle Length} \qquad (1)$$

The first wake-up timing is generally calculated using constant information, such as, for example, an identifier of the UE, and the DRX cycle length is set by the Node B according to types of services and is then notified to the UE.

In the DRX operation, when the length of the DRX cycle is set long, the connected mode UE that performs no data transmission/reception for the DRX cycle, may probably suffer from uplink synchronization loss.

For example, a UE employing Adaptive Modulation and Coding (AMC) should periodically report the channel quality (or channel status) of the UE to the Node B at a particular timing. A connected mode UE, operating in a discontinuous transmission/reception mode, periodically reports the channel quality using a particular channel at a particular timing before the wake-up timing. This conventional channel quality report is very inefficient in that the UE reports the channel quality even when there is no need for actual data reception.

Therefore, a need exists for a discontinuous transmission/reception operation to minimize power consumption of a connected mode UE supporting a next generation mobile communication system, thereby solving problems of the prior art.

In addition, a need exists for an efficient channel quality report procedure and uplink synchronization procedure of the connected mode UE, distinguishable from conventional ones, for a next generation mobile communication system.

SUMMARY OF THE INVENTION

The present invention addresses at least the above-described problems and/or disadvantages and provides at least the advantages described below. Accordingly, an aspect of the present invention is to provide a method and apparatus for minimizing power consumption in receiving data by a connected mode UE in a mobile communication system.

Another aspect of the present invention is to provide a method and apparatus for minimizing power consumption in receiving downlink data by a connected mode UE operating in a discontinuous transmission/reception mode in a mobile communication system.

Another aspect of the present invention is to provide a method and apparatus for establishing uplink synchronization and receiving downlink data by a connected mode UE operating in a DRX mode in a mobile communication system.

According to an aspect of the present invention, there is provided a method for performing a DRX operation by a connected mode UE in a mobile communication system. The method includes waking up at a wake-up timing, and determining whether an incoming data indication is received from a Node B; reestablishing uplink synchronization upon receipt of the incoming data indication; and waking up after sleeping for a time from the incoming data indication reception timing, receiving a transmission resource allocation message from the Node B, and receiving downlink data over allocated transmission resources.

According to another aspect of the present invention, there is provided a method for performing a DRX operation by a connected mode UE in a mobile communication system. The method includes waking up at a wake-up timing, and determining whether an incoming data indication from a Node B is included in downlink transmission resource information; reestablishing uplink synchronization upon receipt of the incoming data indication; and waking up after sleeping for a time from the incoming data indication reception timing, and receiving downlink data over allocated transmission resources.

According to still another aspect of the present invention, there is provided a method for performing a DRX operation by a connected mode UE in a mobile communication system. The method includes after sleeping for a time corresponding to a DRX cycle length, waking up at a wake-up timing, and receiving from a Node B an incoming data indication indicating transmission of downlink data and a dedicated signature for the connected mode UE; transmitting a preamble coded with the dedicated signature to the Node B at a time slot; receiving a control channel including temporary identifier information of the UE, allocated uplink transmission resource information, and timing adjustment information for transmitting uplink feedback information, from the Node B in response to the preamble; transmitting the uplink feedback information to the Node B using the allocated uplink transmission resource information based on the timing adjustment information, and establishing uplink synchronization; and after establishing the uplink synchronization, receiving downlink data from the Node B.

According to yet another aspect of the present invention, there is provided a DRX apparatus of a connected mode UE in a mobile communication system. The DRX apparatus includes a DRX controller for performing a sleep/wake-up control operation on DRX cycle length information, first wake-up timing information, timing information for channel quality report, and a transmission resource allocation message according to reception time information; a control channel processor for, under control of the DRX cycle controller, waking up at a timing, receiving a control channel, and checking an incoming data indication indicating transmission of downlink data; an uplink synchronization controller for performing uplink synchronization according to the check result of the control channel processor; a channel quality reporter for reporting a channel quality after sleeping for a time according to the check result of the control channel processor; and a receiver for receiving downlink data after sleeping for a time according to the check result of the control channel processor.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
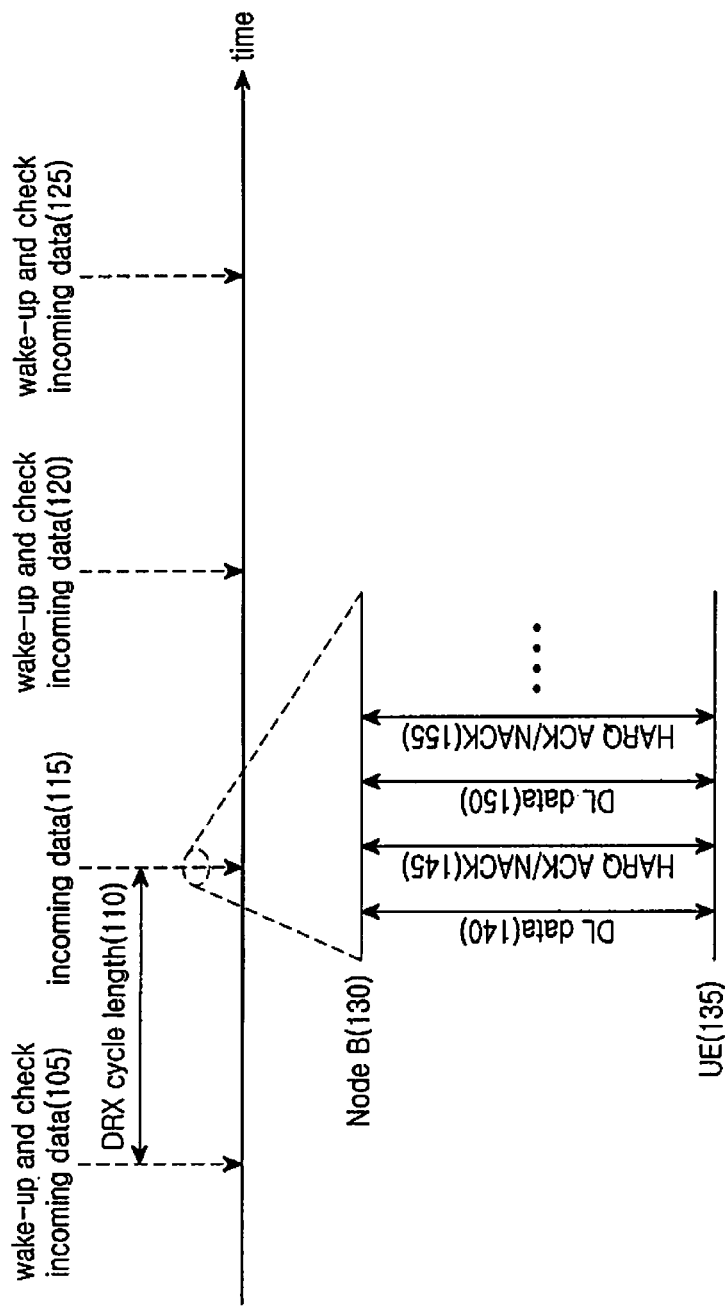
FIG. 1 illustrates a DRX operation of a connected mode UE according to the prior art.

Preferred embodiments of the present invention will now be described in detail with reference to the annexed drawings. In the following description, a detailed description of known functions and configurations incorporated herein has been omitted for clarity and conciseness.

Although the present invention will be described herein with reference to a Long Term Evolution (LTE) system, by way of example, the same can be applied to all communication systems employing a Discontinuous Reception (DRX) mode without separate modification. In addition, the present invention can be applied to mobile communication systems employing Node B scheduling without separate modification. Further, the present invention can be applied to communication systems employing Hybrid Automatic Repeat reQuest (HARQ) and communication systems supporting uplink services.

In particular, a User Equipment (UE) can perform uplink transmission after uplink synchronization is established in a communication system using Orthogonal Frequency Division Multiplexing (OFDM) as a wireless access technology.

The phrase 'establishing uplink synchronization' as used herein refers to adjusting transmission timing of the UE so a transmission signal of the UE is located within a specific time interval called Cyclic Prefix (CP) at the Node B arrival timing. The uplink synchronization is established in a way that the UE transmits a particular preamble over an uplink shared channel, receives timing adjustment information from the Node B, and then adjusts uplink transmission timing according to the timing adjustment information.

The uplink synchronization, once established, is kept while the downlink/uplink data transmission/reception continues. However, the uplink synchronization may be lost in the state where there is no data transmission/reception for a long time. Therefore, if the connected mode UE has not performed data transmission/reception for a longer than predetermined time due to the DRX, there is high possibility that the Node B cannot transmit data to the connected mode UE because the uplink synchronization is not established.

Therefore, in the present invention, before transmitting data to a connected mode UE that has not performed data transmission/reception for a long time due to the DRX, the Node B sends an 'incoming data indication' indicating presence of transmission data to the UE, so the UE matches uplink synchronization before receiving the data. In addition, upon receipt of the incoming data indication, the connected mode UE reports a measured downlink channel quality value, thereby facilitating efficient downlink data transmission/reception.

The present invention provides a scheme for applying discontinuous transmission/reception to the connected mode UE to allow the UE to minimize power consumption of the UE. Particularly, in the DRX mode, the connected mode UE, only when the UE receives an incoming data indication, matches uplink synchronization, reports channel quality of the UE, and then performs data reception.

In other words, in the present invention, when the Node B has data to transmit to a particular connected mode UE, the Node B first sends an incoming data indication to the UE that has waken up at the wake-up timing, before data transmission, and the UE, before data reception, first establishes uplink synchronization and reports channel quality of the UE. Therefore, in the present invention, the uplink synchronization remains established before the UE receives at least one data burst, and the UE reports the channel quality only when there is data to receive. This is because periodically reporting the channel quality by the UE is inefficient when the UE operates in the DRX mode in the connected mode.

As described above, in the present invention, when the connected mode UE operates in the DRX mode, the UE reports the channel quality only at the scheduled data reception timing, i.e. only when the UE receives an incoming data indication, thereby preventing unnecessary channel quality report and increasing efficiency of the DRX mode.

In addition, the phrases 'transmission data indication information' and 'indication information indicating transmission of downlink data', as used herein, have the same meaning as the incoming data indication, and are interchangeably used.

Further, the connected mode UE according to the present invention is a UE in the mode where the UE is Radio Resource Control (RRC)-connected to the upper layer. This means a new-mode UE distinguishable from the $3^{rd}$ Generation Partnership Project (3 GPP) idle mode UE that determines whether there is any signaling from the upper layer using the DRX parameters determined in the state where there is no existing RRC connection.

Figure 2:
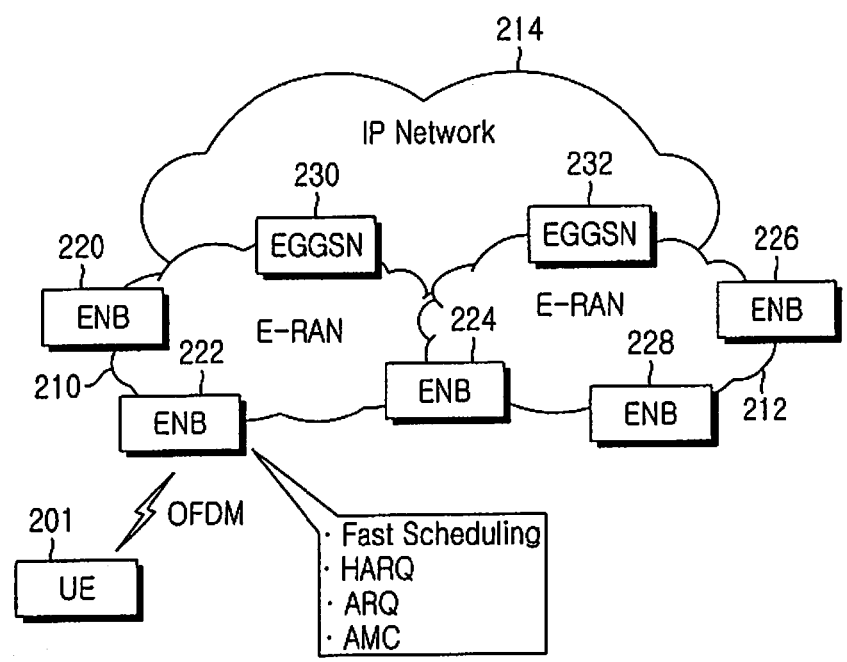
FIG. 2 illustrates a next generation mobile communication system to which the present invention is applicable.

FIG. 2 shows an example of a next generation mobile communication system to which the present invention is applicable.

In FIG. 2, Evolved UMTS Radio Access Networks (E-RANs) 210 and 212 each are simplified to a 2-node configuration of Evolved Node Bs (ENBs, or Node Bs) 220, 222, 224, 226 and 228, and anchor nodes (Evolved Gateway General Packet Radio Services (GPRS) Service Node (EGGSN)) 230 and 232. A UE 201 accesses an Internet Protocol (IP) network 214 via the E-RAN 210.

The ENBs 220 to 228 each correspond to the existing Node B of the UMTS system, and are connected to the UE 201 over wireless channels. Unlike the existing Node B, the ENBs 220 to 228 perform complex functions. In LTE, because all user traffics including real-time services, such as Voice over IP (VoIP), are serviced over a shared channel, there is a need for an apparatus for collecting channel quality information of UEs and performing scheduling depending thereon, and this is managed by the ENBs 220 to 228.

To realize a data rate of a maximum of 100 Mbps, LTE may use OFDM as a wireless access technology in a 20-MHz (Megahertz) bandwidth. Further, LTE may employ Adaptive Modulation & Coding (AMC) that adaptively determines a modulation scheme and a channel coding rate according to the channel quality of the UE.

To employ AMC, the UE reports channel quality of the UE to the Node B. In this case, the UE, while transitioning to the connected mode, is allocated a channel to be used for the channel quality report, and periodically reports the channel quality over the allocated channel.

Therefore, in the present invention, when the connected mode UE operates in the DRX mode, the UE reports the channel quality only at the scheduled data reception timing, i.e. only when the UE receives an incoming data indication, thereby preventing unnecessary channel quality report and increasing efficiency of the DRX mode.

Although HARQ is performed between the ENBs 220 to 228 and the UE 201 even in the LTE system like in the communication system supporting the High Speed Downlink Packet Access (HSDPA) or Enhanced uplink Dedicated Channel (E-DCH) service, Outer ARQ can be performed in the upper layer because meeting various Quality of Service (QoS) conditions is not possible with only the HARQ. The Outer ARQ other than ARQ is performed between the UE 201 and the ENBs 220 to 228. In addition, the shared channel to which the present invention is applied, as used herein, refers to a channel serving as HS-PDSCH (in HSDPA) or E-DP-DCH (in E-DCH) over which user traffics are transmitted.

Many next generation mobile communication systems including the LTE system use HARQ as an error correction technique. HARQ refers to a technique for soft-combining previously received data with retransmitted data without discarding the previously received data, thereby increasing a reception success rate. More specifically, a receiving HARQ entity determines presence/absence of error in a received packet, and then sends a HARQ positive Acknowledgement (HARQ ACK) signal or an HARQ negative Acknowledgement (HARQ NACK) signal to a transmitting HARQ entity according to the determination result.

Therefore, the transmitting HARQ entity performs retransmission of the HARQ packet or transmission of a new HARQ packet according to the HARQ ACK/NACK signal. Further, the receiving HARQ entity soft-combines retransmitted packet with the previously received packet, thereby reducing the error occurrence rate.

In a communication system employing Node B scheduling, a scheduler of the Node B may allocate transmission resources to a corresponding UE to transmit a user packet to the UE or to allow the UE to transmit a user packet, and a corresponding transmission resource allocation message is signaled to the UE over a channel. For convenience, the channel over which the transmission resource allocation message is transmitted is referred to herein as a grant channel.

In OFDM, a transmission resource refers to a particular frequency band for a particular interval. An LTE system may divide a full system frequency band into 24 bandwidths and use them as transmission resources, and the Node B may allocate some of the 24 bandwidths to the UE for 0.5 milliseconds (msec). The transmission resource allocation message includes (i) an identifier of the UE that is an identifier of the UE scheduled to be allocated transmission resources, (ii) transmission resource information regarding transmission resources allocated to the UE, and (iii) other information, such as a length of a valid period of the transmission resources or the like.

The UE, upon receiving a transmission resource allocation message containing the identifier of the UE over the grant channel, receives or transmits data over the allocated transmission resources.

In brief, in the present invention, when the connected mode UE operates in the DRX mode, the Node B first sends an incoming data indication to the UE before the actual data transmission. After receiving the incoming data indication, the UE matches uplink synchronization and reports channel quality of the UE, thereby facilitating efficient data reception. In this way, the present invention allows the UE operating in the DRX mode to establish uplink synchronization and report the channel quality of the UE only when the UE actually has data to transmit, thereby setting the DRX cycle long and minimizing power consumption of the UE.

Figure 3:
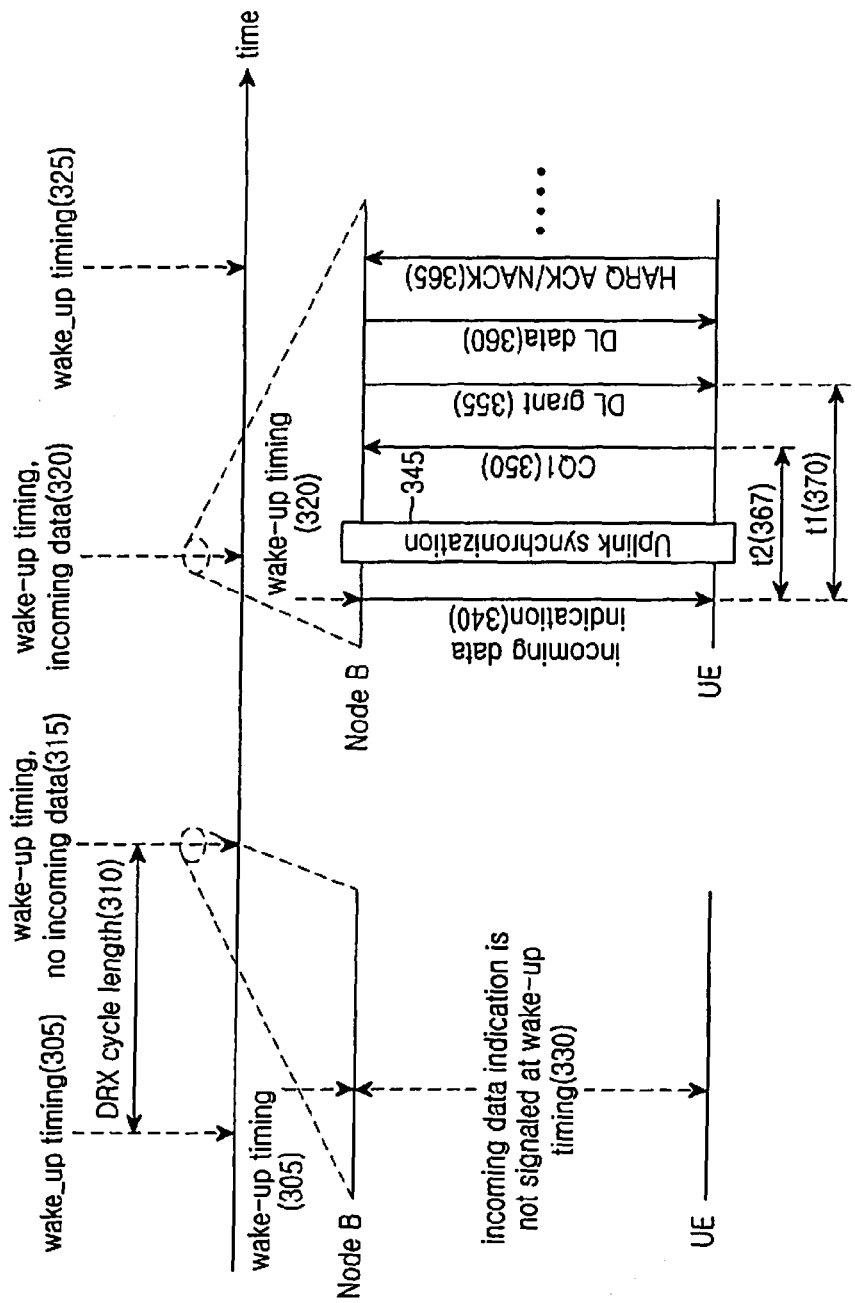
FIG. 3 illustrates a DRX operation of a connected mode UE according to a first embodiment of the present invention.

FIG. 3 shows a DRX operation of a connected mode UE according to a first example of the present invention.

In FIG. 3, in a call setup process, upon receipt of DRX-related parameters signaled from a Node B, a UE calculates a wake-up timing using the DRX-related parameters. The DRX-related parameters can include, for example, a DRX cycle length 310, first wake-up timing calculation information, t1, t2, etc.

The DRX cycle length 310 indicates a length of a period between wake-up timings, and the Node B selects an appropriate value according to types of services. The Node B uses a long DRX cycle length for the services less susceptible to the delay, and a short DRX cycle length for the services highly susceptible to the delay.

First wake-up timing calculation information can be first wake-up timing directly signaled to the UE, or can be first wake-up timing information the UE can calculate by combining the identifier of the UE, the DRX cycle length, etc.

t1 indicates a period between the timing when the UE receives an incoming data indication and the timing when the UE receives transmission resource information over the grant channel.

t2 indicates a period between the timing when the UE receives an incoming data indication and the timing when the UE sends channel quality report information. The UE, after establishing uplink synchronization, keeps the sleep mode until the timing when the UE performs the channel quality report.

After the call setup is completed, the UE calculates the first wake-up timing, and then calculates the next wake-up timing by adding a multiple of a length of the DRX cycle to the first wake-up timing.

The connected mode UE transitions to the sleep mode until the calculated wake-up timing, and monitors a particular downlink control channel at the corresponding particular wake-up timing 315.

The downlink control channel includes an incoming data indication for the UE, and if the UE fails to receive the incoming data indication in step 330, the UE transitions back to the sleep mode and keeps the sleep mode until the next wake-up timing 320. The UE re-monitors the downlink control channel at the next wake-up timing 320.

The Node B sends an incoming data indication to the UE over the downlink control channel at the wake-up timing 320 in step 340 when the Node B determines at an arbitrary time that the Node B has data stored in a buffer to transmit to the UE.

Therefore, upon receipt of the incoming data indication, the UE that has waken up at the wake-up timing 320, starts timers to which the t1 and t2 are input, and performs an uplink synchronization establishment operation in step 345. In this case, the UE can skip the uplink synchronization establishment process when the UE determines that the uplink synchronization has already been established.

For example, if a particular period has not elapsed yet after the UE performed data transmission/reception, the UE can determine that the uplink synchronization is being kept. Alternatively, if the sub-frame boundary of the current timing is similar to the sub-frame boundary that the UE has previously recognized while establishing the uplink synchronization, the UE can determine that the uplink synchronization is being kept.

After completing the uplink synchronization establishment process, the connected mode UE keeps the sleep mode again until the t2 timer used for sending the channel quality report expires.

After the t2 timer expires in step 367, the UE reports the channel quality information (CQI) of the UE using a particular channel in step 350. The channel quality is information based on which the Node B can determine an appropriate MCS level and transmission power, and the UE reports the channel quality based on received equality measurement results on particular downlink pilot channels.

A channel previously allocated to the UE can be used as the channel over which the channel quality information is transmitted. Alternatively, the Node B can signal information on the channel used for making the channel quality report on the incoming data indication, after dynamically allocating the channel over which the UE will transmit the channel quality information.

After the above processes are completed, the UE switches to the sleep mode and keeps the sleep mode again until t1 expires.

If the set t1 expires in step 370, the connected mode UE wakes up and receives a transmission resource allocation message in step 355. The transmission resource allocation message, provided for sending downlink transmission resources to the UE over the grant channel, includes identifier information of the UE, transmission resource information, and valid period information of the transmission resources.

Thereafter, the connected mode UE receives data over the allocated downlink transmission resources in step 360, and performs a particular HARQ process on the received data in step 365. Upon receiving from the Node B a signal indicating that there is no more transmission data, the UE switches to the sleep mode and keeps the sleep mode until the next wake-up timing 325.

Figure 4:
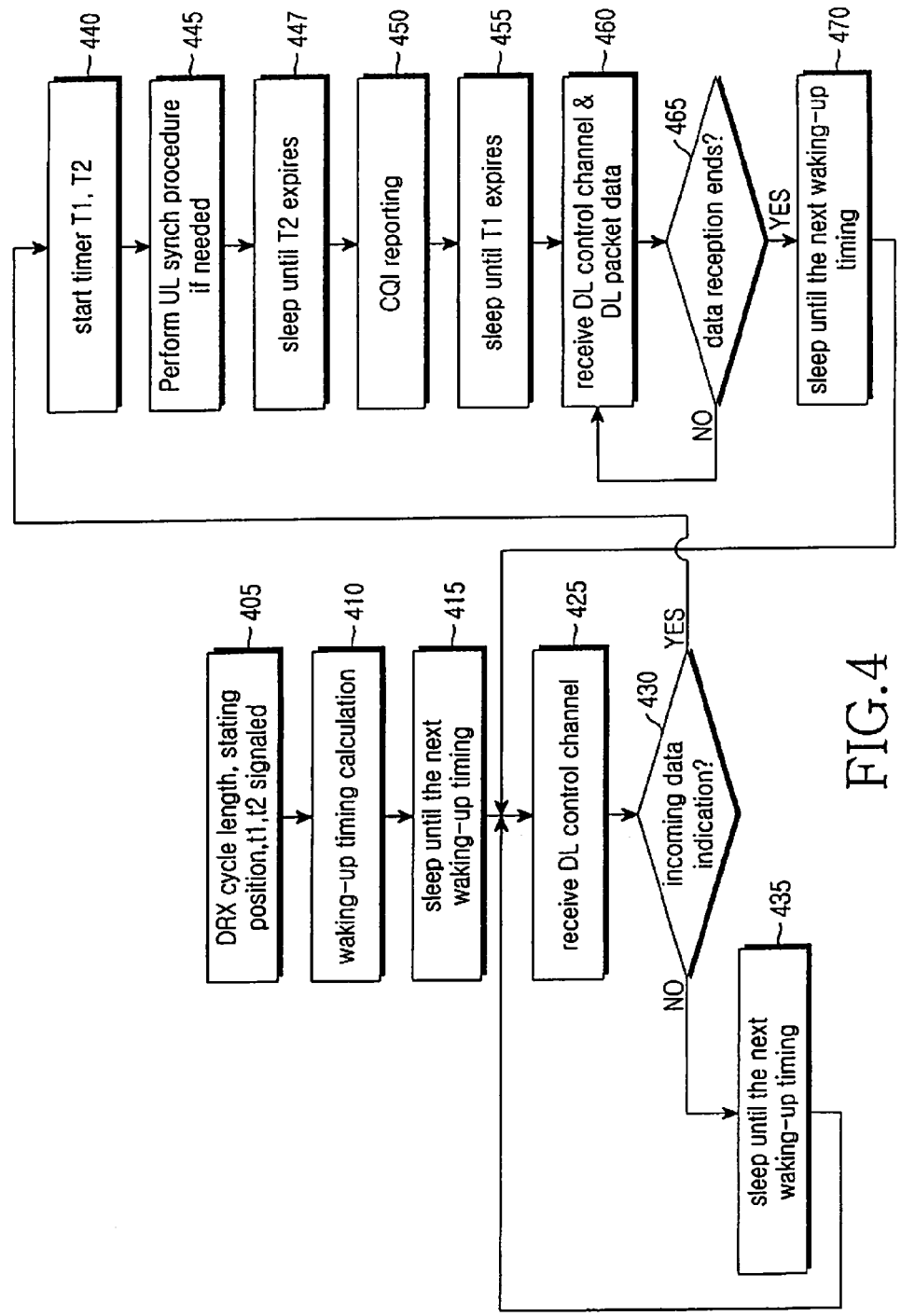
FIG. 4 is a flowchart illustrating a DRX operation of a connected mode UE according to the first embodiment of the present invention.

FIG. 4 shows a DRX operation of a connected mode UE according to the first example of the present invention.

In step 405 of FIG. 4, the UE receives DRX cycle length, first wake-up timing calculation information, t1, and t2 signaled from a Node B through a call setup process.

In step 410, the UE calculates a wake-up timing using the received information. The wake-up timing can be calculated using previously described Equation (1).

In step 415, the connected mode UE switches to the sleep mode, and keeps the sleep mode until the calculated wake-up timing. At the wake-up timing, the UE receives a particular downlink control channel in step 425, and then proceeds to step 430 where the UE determines whether a incoming data indication is received. The particular downlink control channel can be a grant channel. Alternatively, the incoming data indication can be sent over a downlink transmission resource allocation message.

As described above, the transmission resource allocation message contains (i) an identifier of the UE that will be allocated transmission resources, (ii) information on the transmission resources to be allocated, and (iii) the other information. The UE and the Node B can reserve one of the code points in the other information and use the one code point to indicate the incoming data indication. Further, the Node B includes, in the transmission resource information corresponding to the incoming data indication, information on the channel over which the UE will perform channel quality report.

Upon failure to receive the incoming data indication in step 430, the UE proceeds to step 435 where it switches to the sleep mode, and then keeps the sleep mode until the next wake-up timing.

However, upon receipt of the incoming data indication in step 430, the connected mode UE proceeds to step 440 where the UE starts a T1 timer and a T2 timer. The t1 and t2 signaled in the call setup process are input to the T1 timer and the T2 timer, respectively.

If needed, the UE performs an uplink synchronization establishment process according to a particular scheme in step 445. That is, the UE transmits a preamble over a particular uplink shared channel, and the Node B transmits transmission timing adjustment information over a particular downlink channel. Then the UE adjusts the transmission timing according to the transmission timing adjustment information.

In step 447, the UE enters the sleep mode and then keeps the sleep mode until the T2 timer expires after completing the above process. If the T2 timer expires, the UE proceeds to step 450 where the UE reports Channel Quality Indication (CQI) according to a particular scheme. The UE can transmit the CQI using transmission resources corresponding to the transmission resource information transmitted together with the incoming data indication.

Thereafter, in step 455, the UE switches to the sleep mode and keeps the sleep mode until the T1 timer expires. If the T1 timer expires, the UE receives, in step 460, allocated downlink transmission resources over a grant channel, and receives data over the allocated downlink transmission resources.

The UE performs in step 465 the data reception until the UE receives a signal indicating an end of the data transmission from the Node B. Upon receipt of the signal indicating the end of the data transmission from the Node B, the UE proceeds to step 470 where the UE switches to the sleep mode and then keeps the sleep mode until the next wake-up timing.

In the first example of the present invention, as shown in FIGS. 3 and 4, the Node B should separately send the incoming data indication and the downlink transmission resource allocation message to transmit data to the connected mode UE in the DRX mode.

Figure 5:
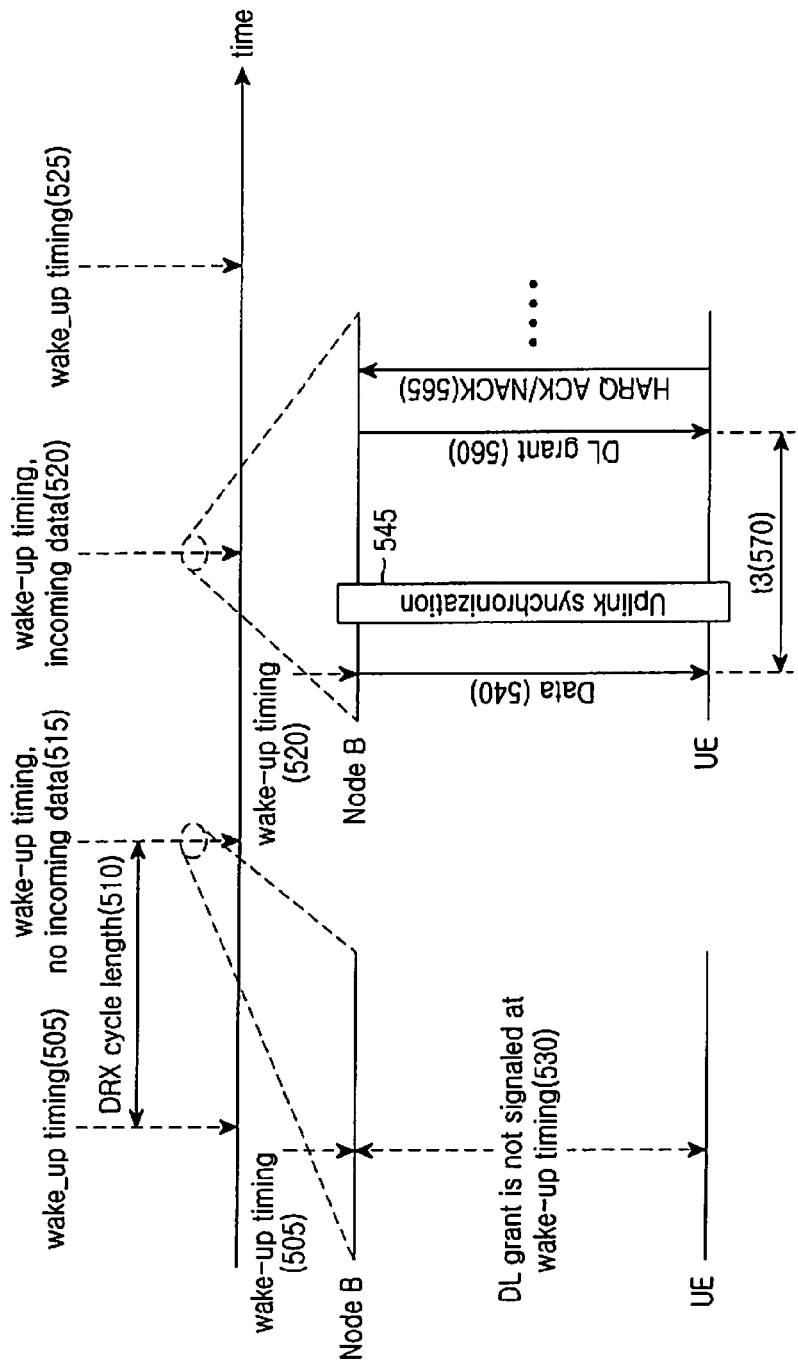
FIG. 5 illustrates a DRX operation of a connected mode UE according to a second embodiment of the present invention.
Figure 6:
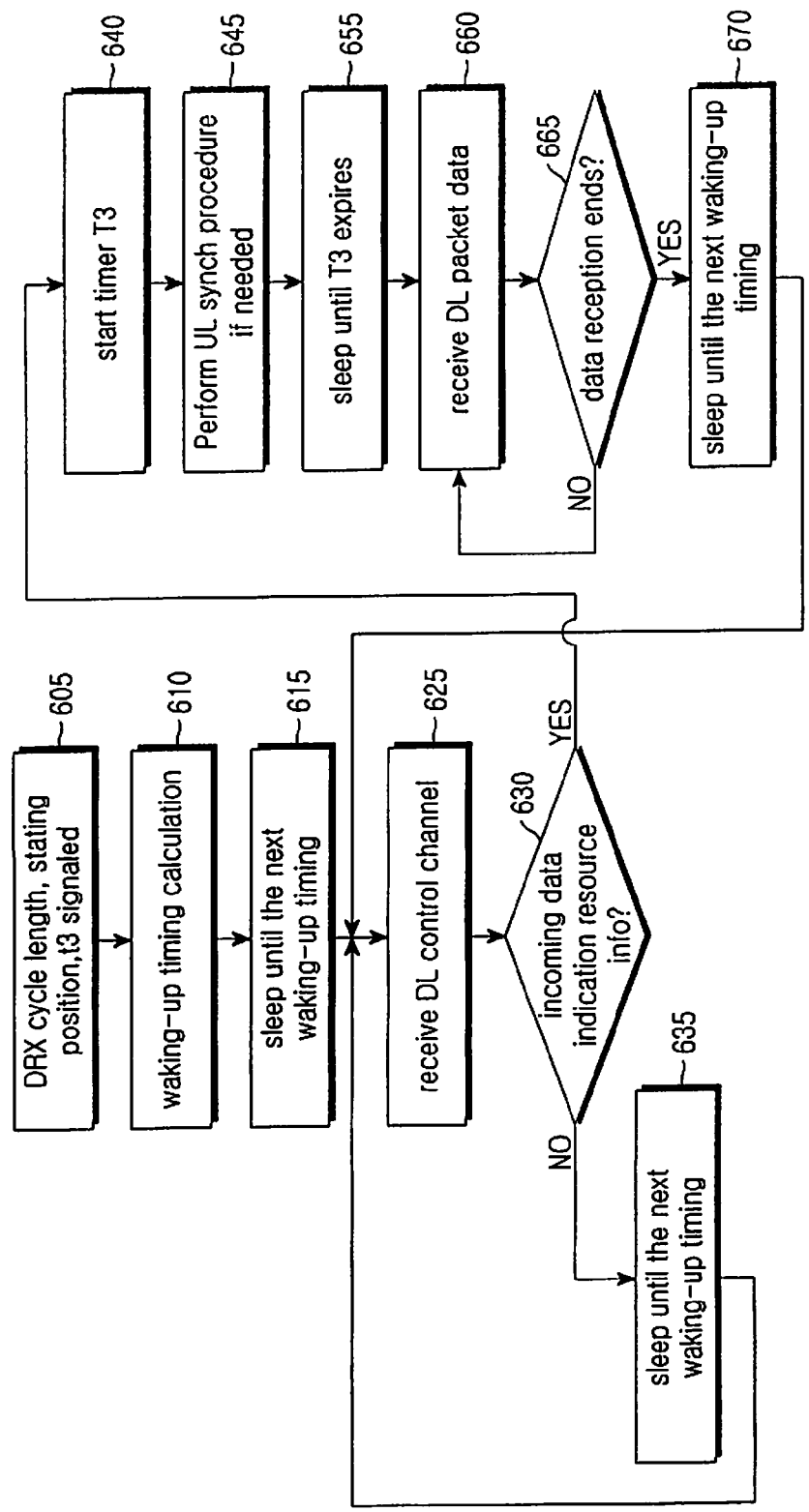
FIG. 6 is a flowchart illustrating a DRX operation of a connected mode UE according to the second embodiment of the present invention.

A second example of the present invention is shown in FIGS. 5 and 6, and provides a method for sending incoming data indication together with transmission resource allocation information to be used for data transmission/reception, thereby avoiding separately sending a downlink transmission resource allocation message.

The second example of the present invention sends the incoming data indication together with transmission resource allocation information allocated after t3, so the UE can perform downlink data reception without the need to receive separate transmission resource allocation information after establishing uplink synchronization. The second example of the present invention can be applied to the services that do not need to make a separate CQI report because the amount of generated data is small.

FIG. 5 shows a DRX operation of a connected mode UE according to the second example of the present invention.

In FIG. 5, in a call setup process, a UE receives DRX-related parameters signaled from a Node B. The UE calculates a wake-up timing using the DRX-related parameters. The DRX-related parameters can include the following, for example, a DRX cycle length 510, first wake-up timing calculation information, t3, etc.

The DRX cycle length 510 indicates a length of a period between wake-up timings, and the Node B selects an appropriate value according to types of services. The Node B uses a long DRX cycle length which is longer than predetermined length for the services less susceptible to the delay, and a short DRX cycle length which is shorter than predetermined length for the services highly susceptible to the delay.

First wake-up timing calculation information may include the first wake-up timing that can be directly signaled to the UE, or the UE can calculate the first wake-up timing by combining the identifier of the UE, the DRX cycle length, etc.

The t3 indicates information on the timing at which the transmission resource information included in the incoming data indication is actually applied.

After the call setup is completed, the UE calculates the first wake-up timing, and calculates the next wake-up timing by adding a length of the DRX cycle to the first wake-up timing.

The connected mode UE keeps the sleep mode until the wake-up timing, and monitors a downlink control channel at a wake-up timing 515. If the UE fails to receive the incoming data indication over the downlink control channel for a particular period in step 530, the UE transitions back to the sleep mode and keeps the sleep mode until the next wake-up timing 520.

After transitioning to the sleep mode, the UE re-monitors the downlink control channel at the next wake-up timing 520. In this case, if the Node B recognizes that it has data stored in a buffer to transmit to the UE, the Node B sends an incoming data indication to the UE at the wake-up timing 520 in step 540). At this point, the Node B transmits to the UE even the transmission resource allocation information to be used after t3.

Therefore, upon receipt of the incoming data indication, the UE that has waken up at the wake-up timing 520, starts a timer to which the t3 is input, and performs an uplink synchronization establishment operation in step 545. In this case, the UE can skip the uplink synchronization establishment process when the UE determines that the uplink synchronization has already been established.

After completing the uplink synchronization establishment, the UE switches back to the sleep mode and keeps the sleep mode until the t3 expires. If the t3 expires in step 570, the UE receives the data over the transmission resources allocated while receiving the incoming data indication in step 560, and performs an HARQ process on the transmitted data in step 565.

Thereafter, upon receiving from the Node B information (signal) indicating that there is no more transmission data, the UE switches to the sleep mode and keeps the sleep mode until the next wake-up timing 525.

FIG. 6 shows a DRX operation of a connected mode UE according to the second example of the present invention.

In step 605 of FIG. 6, a UE receives DRX cycle length, first wake-up timing calculation information, and t3 signaled from a Node B through a call setup process.

In step 610, the UE calculates a wake-up timing using the received information. The wake-up timing can be calculated using the previously described Equation (1).

In step 615, the UE switches to the sleep mode, and keeps the sleep mode until the calculated wake-up timing. At a particular wake-up timing, the UE receives a particular downlink control channel in step 625, and then proceeds to step 630 where the UE determines whether an incoming data indication is received over the downlink control channel. The incoming data indication can contain the downlink transmission resource information that the UE can use after the time t3.

The incoming data indication can be sent over a downlink transmission resource allocation message. The downlink transmission resource information that the UE can use after the time t3, is contained in a transmission resource information field of the downlink transmission resource allocation message.

Therefore, the downlink transmission resource allocation message that the UE has received at the particular wake-up timing is recognized not as the general downlink transmission resource allocation message, but as a transmission resource allocation message including incoming data indication. Since the incoming data indication uses a code point reserved in the other information of the downlink transmission resource allocation message, the incoming data indication can be distinguished from the general transmission resource allocation message.

Upon failure to receive the incoming data indication in step 630, the UE proceeds to step 635 where the UE switches back to the sleep mode and then keeps the sleep mode until the next wake-up timing. However, upon receipt of the incoming data indication in step 630, the UE proceeds to step 640 where the UE starts a T3 timer. The t3 signaled in the call setup process is input to the T3 timer.

If needed, the UE performs an uplink synchronization establishment process according to a particular scheme in step 645, and then proceeds to step 655 where the UE switches to the sleep mode and keeps the sleep mode until the T3 timer expires.

After the T3 timer expires, the UE receives in step 660 the data over the downlink transmission resources allocated in the incoming data indication. In step 665, the UE performs the data reception until a signal indicating an end of the data transmission is received from the Node B. Upon receipt of the signal indicating the end of the data transmission from the Node B, the UE proceeds to step 670 where it switches back to the sleep mode and keeps the sleep mode until the next wake-up timing.

Figure 8:
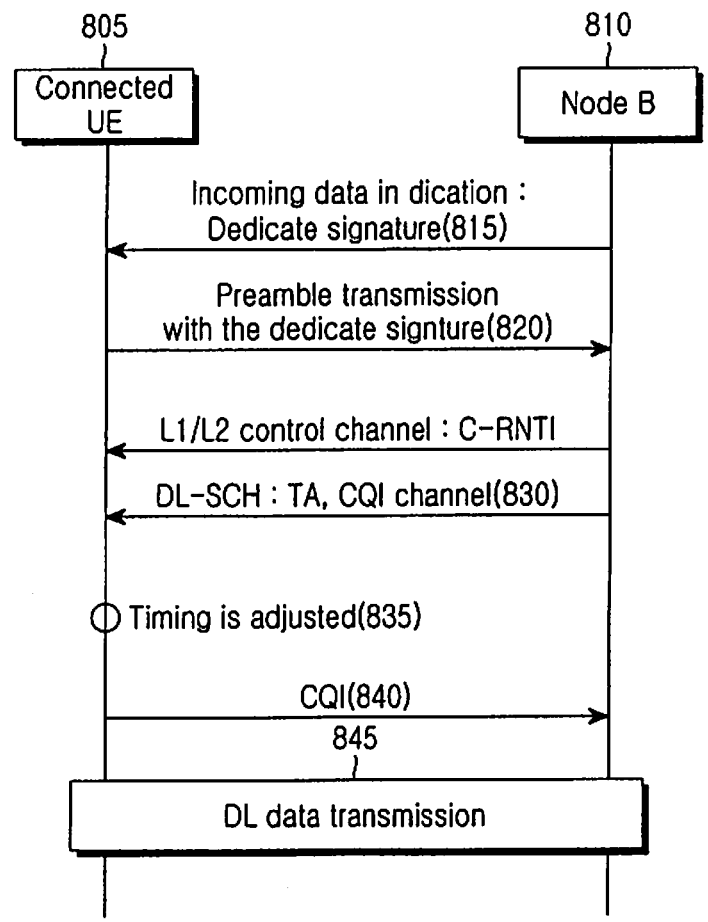
FIG. 8 illustrates a DRX operation of a connected mode UE according to a third embodiment of the present invention.
Figure 9:
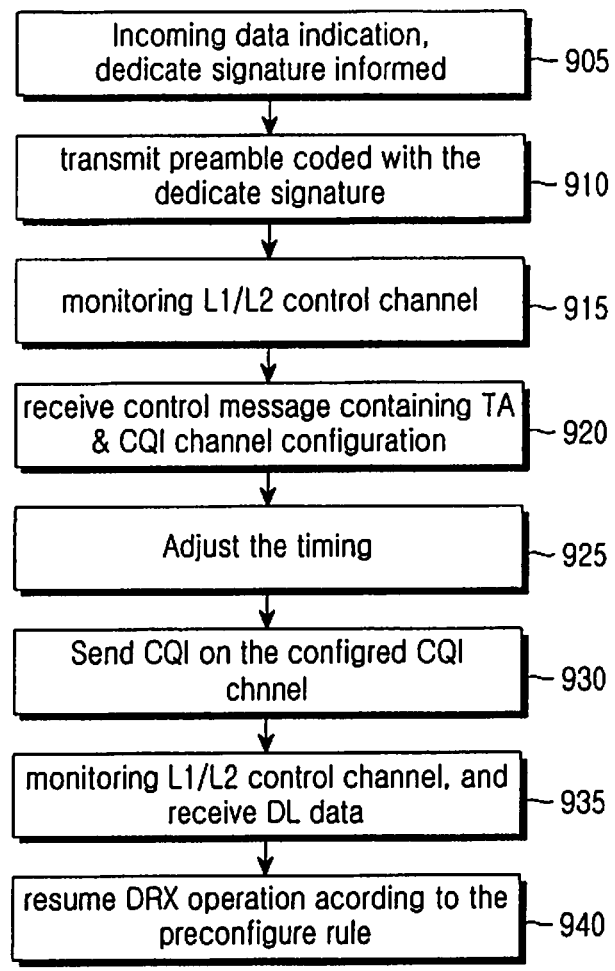
FIG. 9 is a flowchart illustrating an operation of a UE according to the third embodiment of the present invention.

A third example of the present invention is shown in FIGS. 8 and 9 that provides a process in which upon receipt of an incoming data indication, a connected mode UE establishes uplink synchronization with a Node B.

However, in a conventional mobile communication system, the actual uplink synchronization establishment process is defined for an idle mode UE. Therefore, to establish uplink synchronization according to the conventional uplink synchronization establishment rule in a mobile communication system is very inefficient for a connected mode UE.

Therefore, the third example of the present invention provides a scheme in which upon receipt of an incoming data indication, the connected mode UE establishes uplink synchronization with the Node B. Before a description of the third example of the present invention is given, a brief description of a conventional uplink synchronization establishment process of the idle mode UE will be made with reference to FIG. 7.

Figure 7:
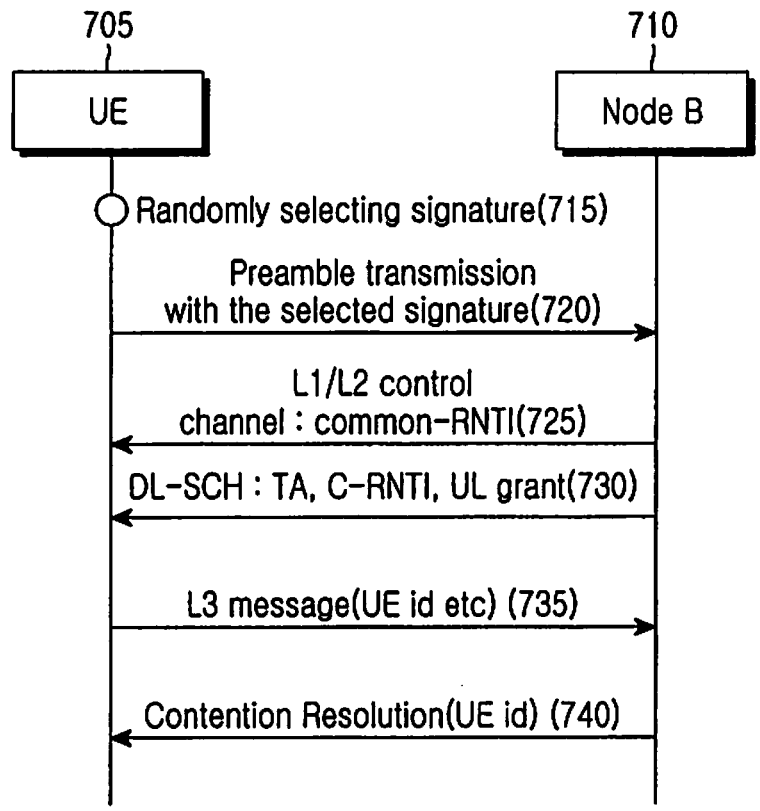
FIG. 7 illustrates a conventional uplink synchronization establishment process of an idle mode UE.

Referring to FIG. 7, upon detecting the need to establish uplink synchronization, an arbitrary UE 705 randomly selects one arbitrary signature from a set of known signatures. The signatures are codes which are orthogonal with each other, and serve for temporarily identifying UEs in the uplink synchronization establishment process in step 715.

Upon detecting an uplink signal coded with an arbitrary signature, a Node B 710 recognizes that an arbitrary UE has started an uplink synchronization establishment process, and communicates with the UE over the signature until the Node B 710 checks a real identifier of the UE.

That is, the UE codes a preamble using the randomly selected signature, and then transmits the randomly selected signature to the Node B at a particular timing in step 720, and upon detecting the preamble coded with the signature, the Node B determines a transmission timing adjustment value (timing adjustment). Further, the Node B allocates a Cell Radio Network Temporary Identity (C-RNTI), or an identifier that the UE will use in the connected mode in step 725, determines uplink transmission resources that the UE will use for sending of an uplink control message, and then sends a control message containing the determined uplink transmission resource information to the UE in step 730. The control message is sent over the general data channel in step 730.

When transmitting the data over the data channel of step 730, the Node B first allocates transmission resources to the UE over a downlink control channel, referred to herein as an L1/L2 control channel, and transmits the data over the allocated transmission resources. A C-RNTI of the UE is contained in the L1/L2 control channel to specify the UE to which transmission resources are allocated, or the C-RNTI is implicitly signaled through Cyclic Redundancy Check (CRC) of the L1/L2 control channel.

However, because the Node B cannot have information on the C-RNTI of the UE now operating in the uplink synchronization establishment process, the Node B contains in the control message the information serving as an identifier of the UE, and signals over the L1/L2 control channel a common identifier indicating that the UE to which transmission resources are allocated is the UE that is performing the uplink synchronization establishment process in step 725.

The UE sends an uplink control message using the transmission resources allocated in step 730, and the uplink control message contains an identifier, referred to herein as a fixed identifier, that can firmly identify the UE in step 735. For example, the fixed identifier can be either an identifier unique all over the world like the International Mobile Subscribe Identity (IMSI), or an identifier unique all over a relatively broader area like the Temporary Mobile Subscribe Identity (TMSI).

If multiple UEs transmit preambles using the same signature in step 720, the given information is information unique to only one UE among the multiple UEs, and the other UEs should re-perform the uplink synchronization establishment process.

To simultaneously transmit preambles using the same signature by the multiple UEs in this way is expressed that a collision has occurred. There is a need for a procedure for detecting that no collision has occurred. To detect that no collision has occurred, the Node B transmits the fixed identifier of the UE over the downlink in step 740, and the UE ends the uplink synchronization process after the fixed identifier of the UE is transmitted over the downlink.

As described above, the conventional uplink synchronization establishment process of the idle mode UE is unsuitable for the UE that performs the uplink synchronization establishment process, because the UE already has the C-RNTI and the UE having no control message to send over the uplink receives an incoming data indication from the Node B while performing the DRX operation in, for example, the connected mode.

That is, the third example of the present invention uses an uplink synchronization establishment process distinguishable from the synchronization establishment process of FIG. 7, after receiving the incoming data indication.

FIG. 8 shows a DRX operation of a connected mode UE according to the third example of the present invention. In particular, the uplink synchronization establishment process of FIG. 8 performs temporary mapping between dedicated signature and C-RNTI.

Referring to FIG. 8, if a Node B 810 has data to transmit to a connected mode UE 805 now in a DRX operation, it sends an incoming data indication to the UE at a particular timing in step 815. The incoming data indication contains the dedicated signature information that the UE will use in the uplink synchronization establishment process.

The present invention will now be described based on the assumption that one cell uses 64 signatures. Therefore, the information indicating the dedicated signature can be expressed with 6 bits. In addition, the dedicated signature should not be used by another UE for the time when the connected mode UE 805 performs the uplink synchronization establishment process. Accordingly, the dedicated signature should not be included in the shared signature set.

Upon receipt of the incoming data indication in step 815, the UE 805 transmits a preamble coded with the dedicated signature at the slot located closest to the timing, among the slots defined for transmitting preambles in step 820.

The Node B 810 has already recognized which timing and signature the UE 805 will use in transmitting the preamble. Therefore, upon detecting the preamble coded with the dedicated signature, the Node B 810, determining that the UE 805 is performing the uplink synchronization establishment process, contains in an L1/L2 control channel a C-RNTI of the UE 805 or implicitly signals the C-RNTI of the UE 805 through CRC of the L1/L2 control channel in step 825, thereby notifying that the data transmitted in step 830 is data transmitted to the UE 805.

Because the C-RNTI of the UE is used herein for the L1/L2 control channel, other UEs performing the uplink synchronization establishment process do not receive the data transmitted in step 830, thereby preventing the collision. The control message transmitted in step 830, i.e. the control message transmitted in response to the preamble coded with the dedicated signature, contains a transmission timing adjustment value and information on a CQI channel that the UE will use in the future.

The UE 805 adjusts a transmission timing according to the transmission timing adjustment value in step 835, and performs CQI transmission according to the CQI channel information in step 840.

If it is determined that the uplink synchronization establishment process is completed, the Node B 810 transmits downlink data to the UE 805 in step 845.

FIG. 9 shows an operation of a UE according to the third example of the present invention.

In step 905 of FIG. 9, the UE receives an incoming data indication and a dedicated signature at a particular timing.

In step 910, the UE transmits a preamble coded with the dedicated signature at the slot located closest to the timing, among the slots defined for transmitting preambles, and then proceeds to step 915 where the UE monitors whether L1/L2 control information matched to its own C-RNTI is received.

For this, upon receipt of the preamble coded with the dedicated signature, a Node B decides to configure a CQI channel allocated to the UE, determines transmission timing adjustment information to be applied to the UE, and configures a control message containing the information. Further, the Node B sends the control message to the UE with a scheme corresponding to the general data transmission process. That is, in step 915, the Node B signals, over the L1/L2 control channel, transmission resources over which the C-RNTI of the UE and the control message will be transmitted, and sends the control message over the transmission resources.

Therefore, the UE, while monitoring the L1/L2 control channel transmitted from the Node B, receives the control message in step 920, and establishes uplink synchronization depending on transmission timing adjustment information contained in the control message in step 925.

The UE sends CQI information at a particular timing according to the signaled CQI channel configuration information in step 930, and monitors the L1/L2 control channel to receive the data transmitted by the Node B in step 935. Further, the UE, while receiving the data transmitted by the Node B, resumes the DRX operation according to a particular procedure. That is, if the data reception is done, the UE transitions to the sleep mode in step 940.

Figure 10:
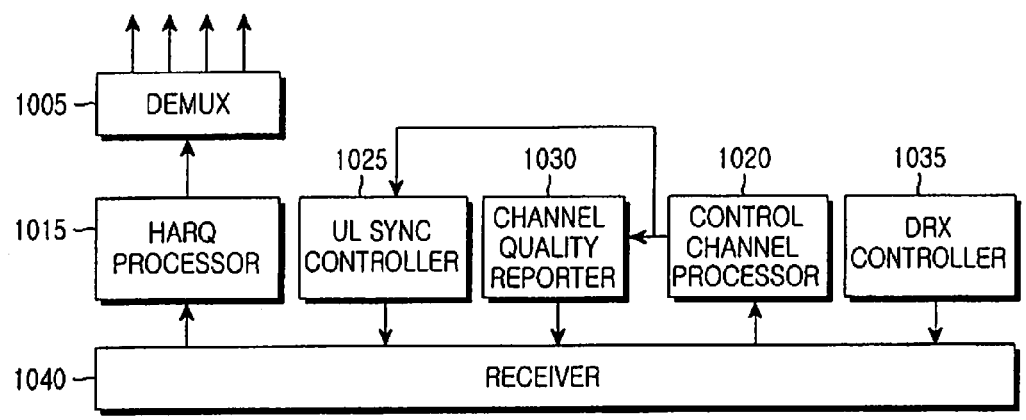
FIG. 10 is a block diagram of a reception apparatus of a UE according to the present invention.

FIG. 10 shows a reception apparatus 1000 of a UE according t the present invention.

The reception apparatus 1000 of FIG. 10 includes a demultiplexer (DEMUX) 1005, an HARQ processor 1015, a receiver 1040, an uplink synchronization controller 1025, a control channel processor 1020, a channel quality reporter 1030, and a DRX controller 1035.

The receiver 1040 is turned ON/OFF under the control of the DRX controller 1035. The DRX controller 1035 calculates wake-up timings using DRX-related parameters, and then turns ON the receiver 1040 at the wake-up timing. If the valid period expires, the DRX controller 1035 turns OFF the receiver 1040 until the next wake-up timing.

The HARQ processor 1015 processes an HARQ packet that the receiver 1040 receives through a particular HARQ operation, and forwards the error-free HARQ packet to the demultiplexer 1005. The demultiplexer 1005 demultiplexes the received HARQ packet to an appropriate upper layer.

Upon receipt of an incoming data indication over a received control channel, the control channel processor 1020 reports this to the uplink synchronization controller 1025 and the channel quality reporter 1030.

Upon receipt of the incoming data indication, the uplink synchronization controller 1025 determines whether there is a need for uplink synchronization reestablishment, and if there is a need to reestablish the uplink synchronization, the uplink synchronization controller 1025 reestablishes uplink synchronization through a particular procedure.

Therefore, according to the first example of the present invention, the channel quality reporter 1030 reports a channel quality over a particular channel after a lapse of T2 from the timing when the incoming data indication was received. In addition, after a lapse of T1 from the timing when the incoming data indication was received, the DRX controller 1035 turns ON the receiver 1040 to receive a transmission resource allocation message, and receives the downlink data over the allocated transmission resources.

According to the second example of the present invention, after lapse of T3 from the timing when the incoming data indication was received, the DRX controller 1035 turns ON the receiver 1040 to receive the data.

According to the third example of the present invention, the DRX controller 1035 turns ON the receiver 1040 to receive the data depending on the transmission timing adjustment information included in L1/L2 control information matched to the C-RNTI allocated thereto. Upon detecting an end of the data reception for the time designated in the transmission timing adjustment information, the DRX controller 1035 turns OFF the receiver 1040.

According to the present invention, to support a next generation mobile communication system, the connected mode UE, when the UE operates in the DRX mode, reports the channel quality of the UE after determining whether there is transmission of actual data. Therefore, the present invention prevents the connected mode UE from unnecessarily periodically reporting the channel quality. In addition, the present invention uses the wireless resources wasted for the periodic channel quality report, for transmission of other information, or uses the saved wireless resources for other services, thereby increasing an efficiency of the limited wireless resources.

In addition, the present invention increases an efficiency of the DRX mode of the connected mode UE, thereby minimizing power consumption of the UE. The minimization of the power consumption maximizes the latency time of the UE, contributing to an increase in the possible service time.

Further, the present invention prevents a collision by other UEs, occurring as the connected mode UE establishes uplink synchronization upon receiving a dedicated signature expressed with a particular bit.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for establishing Time Alignment by a User Equipment (UE) in a mobile communication system, the method comprising:
   receiving, from a Node B, information for identifying a dedicated preamble on a downlink control channel;
   transmitting the dedicated preamble based on the information to the Node B;
   receiving from the Node B a response message to the transmitted dedicated preamble on a downlink shared channel, wherein the response message includes a timing adjustment information and information for a Channel Quality Indicator (CQI) report;
   establishing Time Alignment based on the timing adjustment information included in the response message; and
   transmitting the CQI report based on the information for CQI report to the Node B.

2. The method of claim 1, wherein the information for CQI report comprises information on resource assignment for the CQI report.

3. The method of claim 1, further comprising:
   receiving downlink data from the Node B after establishing Time Alignment.

4. The method of claim 1, wherein the response message further comprises an uplink grant.

5. An apparatus for establishing Time Alignment by a User Equipment (UE) in a mobile communication system, the apparatus comprising:
   a transceiver for receiving, from a Node B, information for identifying a dedicated preamble on a downlink control channel, transmitting the dedicated preamble based on the information to the Node B, receiving from the Node B a response message corresponding to the transmitted dedicated preamble on a downlink shared channel and transmitting a Channel Quality Indicator (CQI) report to the Node B, wherein the response message includes a timing adjustment information and information for the CQI report; and
   a controller operable to establish Time Alignment based on the timing adjustment information included in the response message and to transmit the CQI report based on the information for the CQI report.

6. The apparatus of claim 5, wherein the information for the CQI report comprises information on resource assignment for the CQI report.

7. The apparatus of claim 5, wherein the transceiver receives downlink data from the Node B after establishing Time Alignment.

8. The apparatus of claim 5, wherein the response message further comprises an uplink grant.

9. A method for establishing Time Alignment by a Node B in a mobile communication system, the method comprising:
   transmitting information for identifying a dedicated preamble on a downlink control channel to a User Equipment (UE);
   receiving from the UE the dedicated preamble based on the information;
   transmitting a response message corresponding to the transmitted dedicated preamble on a downlink shared channel to the UE, wherein the response message includes timing adjustment information for establishing Time Alignment and information for a Channel Quality Indicator (CQI) report; and
   receiving the CQI report based on the information for CQI report.

10. The method of claim 9, wherein the information for CQI report comprises information on resource assignment for the CQI report.

11. The method of claim 9, further comprising:
    transmitting downlink data to the UE after establishing Time Alignment.

12. The method of claim 9, wherein the response message further comprises an uplink grant.

13. An apparatus for establishing Time Alignment by a Node B in a mobile communication system, the apparatus comprising:
    a transceiver for transmitting information for identifying a dedicated preamble on a downlink control channel to User Equipment (UE), receiving from the UE the dedicated preamble based on the information, transmitting a response message corresponding to the transmitted dedicated preamble on a downlink shared channel to the UE and receiving a Channel Quality Indicator (CQI) report from the UE; and
    a controller operable to generate the response message including timing adjustment information for establishing Time Alignment and to receive the CQI report based on the information for the CQI report.

14. The apparatus of claim 13, wherein the information for the CQI report comprises information on resource assignment for the CQI report.

15. An apparatus of claim 13, wherein the transceiver transmits downlink data to the UE after establishing Time Alignment.

16. The apparatus of claim 13, wherein the response message further comprises an uplink grant.

* * * * *